Aug. 18, 1936.　　　C. W. COLLENS　　　2,051,680
CITRUS FRUIT KNIFE AND SEED EXTRACTOR
Filed Oct. 15, 1935
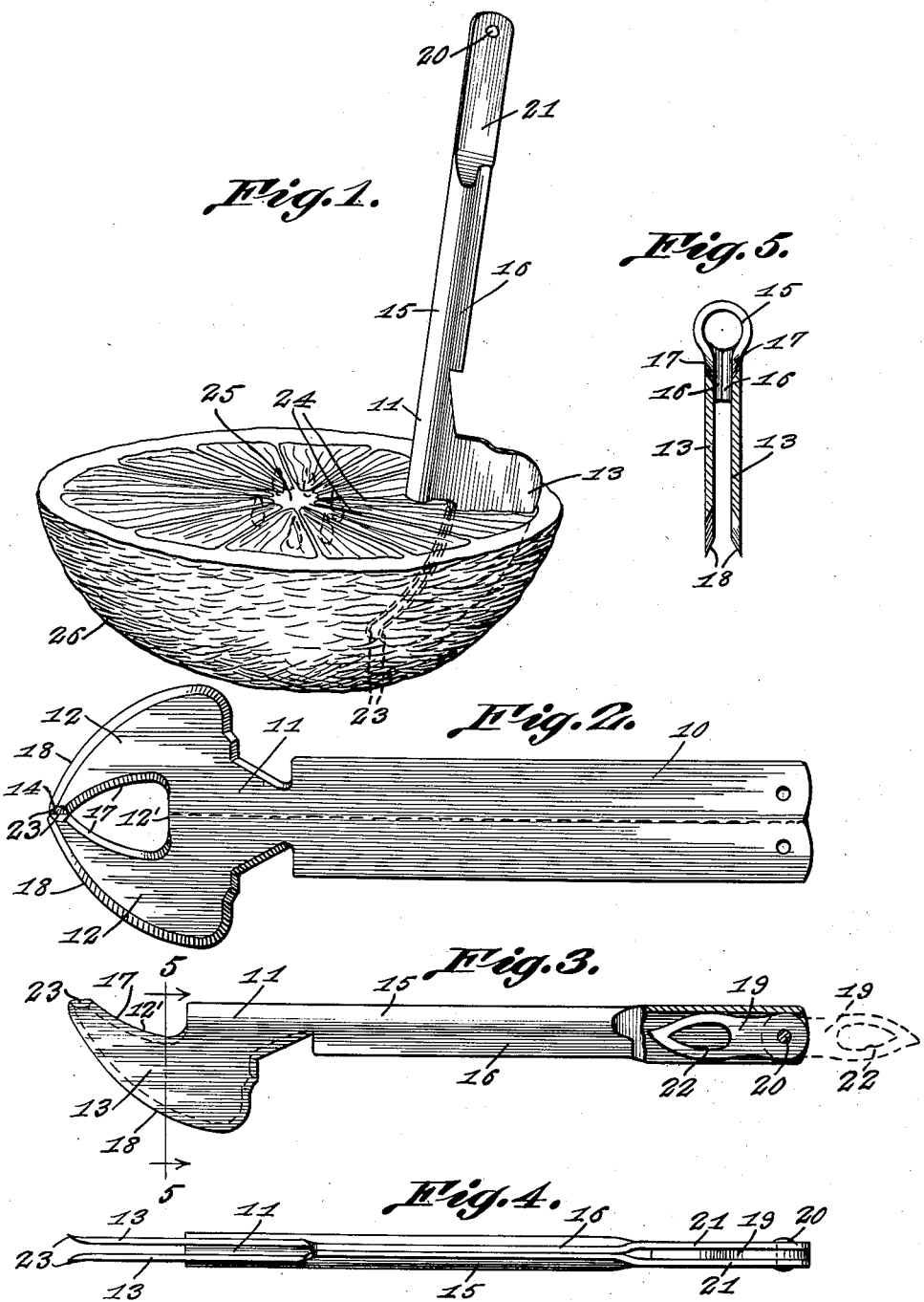
Campbell W. Collens, INVENTOR
BY Victor J. Evans & Co.
ATTORNEY Patented Aug. 18, 1936

2,051,680

UNITED STATES PATENT OFFICE 2,051,680

CITRUS FRUIT KNIFE AND SEED EXTRACTOR

Campbell Wharton Collens, New Orleans, La.

Application October 15, 1935, Serial No. 45,137

2 Claims. (Cl. 146—3)

This invention relates to citrus fruit knives and has for an object to provide a knife for quickly and effectively separating the edible portion of the fruit from the core and fibrous divisions or partitions, allowing these latter to remain intact, while the edible portions are lifted from between the partitions with a spoon.

A further object is to provide a fruit knife having a one piece handle and parallel blades adapted to straddle the partitions, the blades having rear edges of approximately the curvature of the citrus fruit rind to provide guides for properly inserting the knife to most effectively sever the cellular part of the fruit from the fibrous partitions and core.

A further object is to provide a fruit knife of this character having a pivoted knife blade concealed within the handle and adapted to be rocked to extend in prolongation of the handle to sever the outer ends of the partitions from the inner surface of the rind so that the entire non-eatable portion of the fruit may be removed, and the fruit cells to be eaten left in the rind.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a perspective view of a citrus fruit knife constructed in accordance with the invention in applied position.

Figure 2 is a plan view of the sheet metal blank from which the knife is formed.

Figure 3 is a side elevation of the knife with the handle broken away to expose the pivoted knife blade.

Figure 4 is a bottom plan view of the knife shown in Figure 3.

Figure 5 is an enlarged cross sectional view taken on the line 5—5 of Figure 3.

Referring now to the drawing in which like characters of reference designate similar parts in the various views, 10 designates a substantially rectangular blank of sheet metal having at one end a neck 11 which terminates in a heart shaped extension 12 having a similar shaped opening 12' eccentrically disposed therein. The material is cut as shown at 14 at the juncture of the opening with the outer marginal edge of the extension 12.

The blank 10 and neck 11 are rolled along the median line to provide a tubular handle 15, the longitudinal edges of which are straightened and brought together to lie against each other to reinforce and stiffen the handle as shown at 16. The neck 11 when rolled upon itself forms an extension of the handle and the sides of the heart shaped extension are bent to extend substantially parallel with each other to provide knife blades 13 adapted to straddle the fibrous webs or partitions of the grapefruit, or other citrus fruits.

The parallel blades 13 are sharpened at the curved inner edges 17 to sever the cellular flesh of the citrus fruit from the fibrous partitions along the sides of the latter. The rear edges 18 of the blades are sharpened and are arcuate in outline and conform substantially to the curvature of the rind of the fruit and when placed against the rind form guides for the blades as the knife is initially inserted in the fruit. After the blades have been driven to lowermost position in the fruit by a downward pressure of the handle, the handle may be moved laterally toward the core of the fruit to advance the blades along the partition and sever the partition from the cellular flesh of the fruit.

A knife blade 19 is pivoted at one end in the hollow handle as shown at 20 in Figure 3 and is normally concealed within the handle, the sides of the latter being deformed as shown at 21 in Figure 4 to lie flat against the sides of the blade. The blade is provided with an opening 22 of the general shape of a citrus fruit seed. The blade may be rocked on its pivot to extend in prolongation of the handle as shown in dotted lines in Figure 3, whereupon the blade may be run around the inner surface of the rind to sever the outer ends of the partitions from the rind. Seeds may be removed by inserting the blade under the seed until the seed registers with the opening 22 whereupon the seed may be readily lifted from the fruit.

The points 23 of the blades 13 are bent to diverge outwardly from each other as best shown in Figure 4 so as to permit the points being used as seed extractors when the knife blades gradually rise in response to their curved outer edges advancing upon the curved rind of the core as best shown in Figure 1. Such upward movement will force the seed ahead of the diverging pointed ends of the blades and will finally force the seeds up and out of the fruit in the same operation of cutting the fruit pulp from the partitions.

In the operation of the device the knife is inserted in a half of citrus fruit with a downward movement from an initial position in which the ends 23 may be placed near the inner surface of the rind. The two blades 13 straddle one of the fibrous partitions 24 of the fruit and as the knife is driven downwardly the curved outer edges 18 of the blades ride upon the inner surface of the rind and guide the blades forward toward the core 25 of the fruit. The user may now force the handle radially toward the core to sever the partitions from the cellular flesh of the fruit and may rock the knife to lift the points 23 of the blade for extracting seeds. After the partitions have been severed from the cellular flesh of the fruit the handle may be reversed and the pivoted blade 22 opened to extend from the handle, whereupon the blade 22 may be forced downward around the inside of the rind 26 of the fruit to separate the rind from the cellular flesh of the fruit. The eatable portion of the fruit may now be lifted bodily from between the partitions with a spoon.

From the above description it is thought that the construction and operation of the invention will be fully understood without further explanation.

What is claimed is:

1. A citrus fruit knife comprising a substantially rectangular blank of sheet metal having at one end a neck which terminates in a heart shaped extension having a similar shaped opening eccentrically disposed therein, the extension being severed at the juncture of the opening with the marginal edge of the extension, the blank and neck being rolled along the median line thereof to provide a tubular handle, the longitudinal edge portions of the handle being straightened and brought together to lie against each other to reinforce and stiffen the handle, the neck being rolled upon itself and forming an extension of the handle, the sides of the heart shaped extension being bent to extend substantially parallel with each other to provide knife blades adapted to straddle fibrous webs of citrus fruits, the parallel blades being sharpened to sever the citrus fruit from the fibrous partition along the sides of the latter.

2. A citrus fruit knife comprising a substantially rectangular blank of sheet metal having at one end a neck which terminates in a heart shaped extension having a similar shaped opening eccentrically disposed therein, the extension being severed at the juncture of the opening with the marginal edge of the extension, the blank and neck being rolled along the median line thereof to provide a tubular handle, the longitudinal edge portions of the handle being straightened and brought together to lie against each other to reinforce and stiffen the handle, the neck being rolled upon itself and forming an extension of the handle, the sides of the heart shaped extension being bent to extend substantially parallel with each other to provide knife blades adapted to straddle fibrous webs of citrus fruits, the parallel blades being sharpened to sever the citrus fruit from the fibrous partition along the sides of the latter, a knife blade having an opening therein shaped similar to the shape of a citrus fruit seed, the sides of the blank being bent to extend parallel with each other to receive the blade between them, and a pivot pin passed through said sides and through the blade to pivotally mount the blade for concealment between said sides or extended position beyond the end of the handle.

CAMPBELL WHARTON COLLENS.